Patented Jan. 4, 1927.

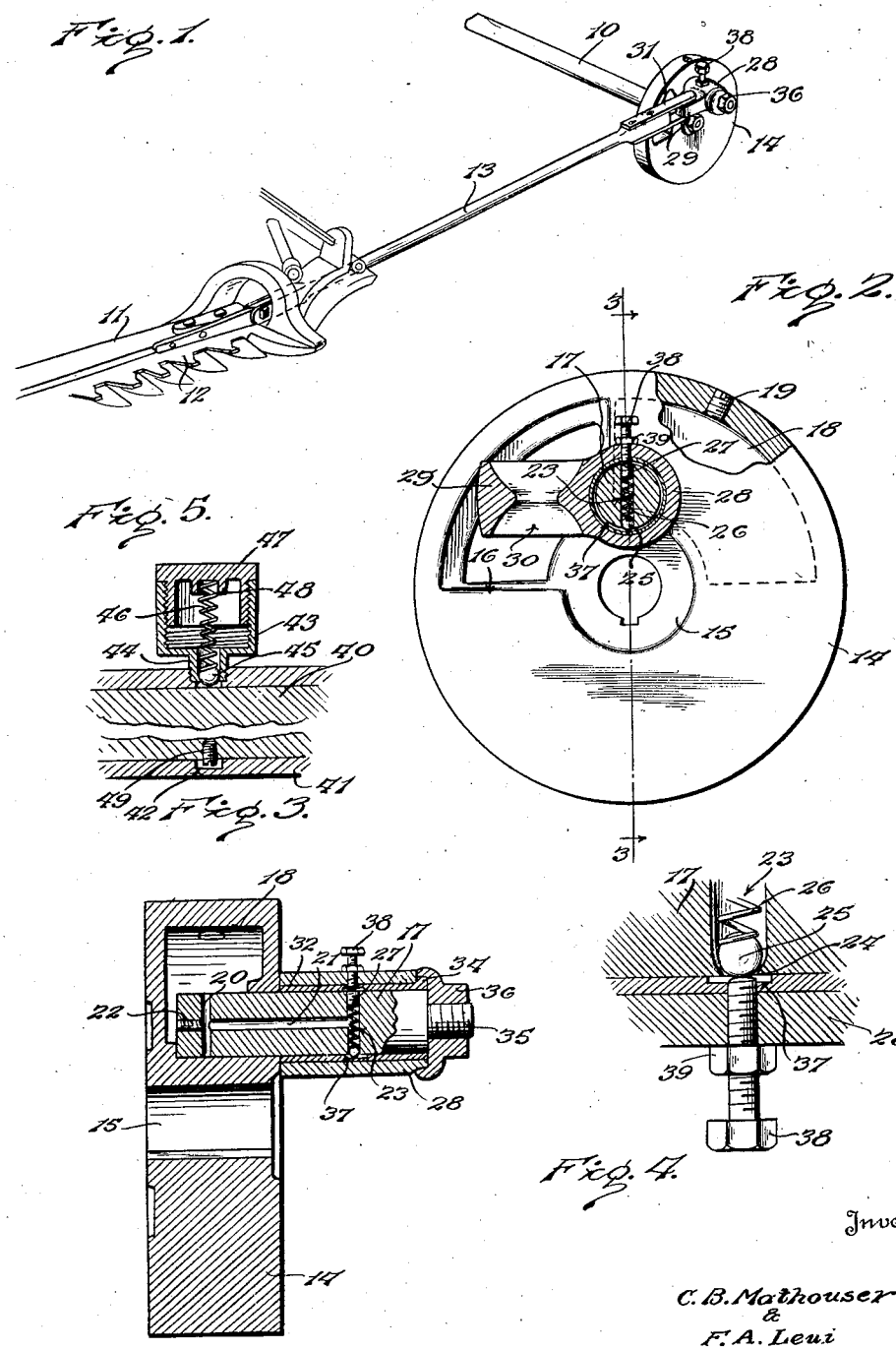

1,612,979

UNITED STATES PATENT OFFICE.

CHARLES B. MATHOUSER AND FOSTER A. LEUI, OF COMSTOCK, NEBRASKA.

AUTOMATIC OILER.

Application filed December 22, 1923. Serial No. 682,176.

This invention relates to an improved automatic oiler for crank pins, shafts, or the like, and while being adapted for general application, is especially designed for use in conjunction with the pitman crank pins of mowing machines.

The invention seeks, as one of its principal objects, to provide an oiler which will automatically function to maintain the pitman crank pin of a mower, for instance, well lubricated at all times.

The invention seeks, as a further object, to provide an oiler wherein the feed of oil to the crank may be easily regulated.

And the invention seeks, as a still further object, to provide an oiler wherein, when the crank pin is at rest, waste of the lubricant will be prevented.

Other and incidental objects will appear hereinafter.

In the drawings:

Figure 1 is a perspective view showing our improved oiler in conjunction with the pitman crank pin of a conventional mowing machine, Figure 2 is an enlarged transverse sectional view through the crank pin and associated parts, a portion of the flywheel or counterbalance wheel carrying the crank pin being broken away and shown in section, Figure 3 is a sectional view on the line 3—3 of Figure 2, looking in the direction of the arrows, Figure 4 is a detail sectional view showing the manner in which the oil valve of the device is opened, and Figure 5 is a fragmentary sectional view showing a slight modification of the invention.

Referring now more particularly to the drawings, we have conventionally shown one of the drive shafts of a mowing machine at 10, the cutter bar at 11, the knife at 12, and the pitman at 13. As is usual, the shaft 10 is equipped at its forward end with a flywheel or counterbalance wheel 14 having a hub 15 to accommodate the shaft and formed throughout the major portion of its area with a solid web or weight 16 to provide a counterbalance for a crank pin 17. In accordance with the present improvements, the web 16 is recessed to provide an oil chamber 18 normally closed by a plug 19 screwed through the periphery of the wheel and, as brought out in Figure 3, the crank pin 17 projects at its inner end into said chamber. Formed through the pin near the inner end thereof is a diametric passage 20 and formed in the pin from the inner end thereof is an axial passage 21 closed at the inner end of the pin by a plug 22. Formed through the pin near its outer end is a diametric discharge passage 23 intersecting the outer end of the passage 21 to communicate therewith and, as shown in detail in Figure 4, the passage 23 is slightly contracted at one end to form an annular valve seat 24. Freely movable within the passage 23 to cooperate with said seat is a spherical check valve 25 and pressing the valve into engagement with the seat is a spring 26. Removably screwed into the passage 23 at the end thereof opposite the valve seat 24 is a plug 27 retaining said spring.

Connecting the pitman 13 with the crank pin 17 is a bearing 28 having a lateral ear 29 recessed from opposite sides thereof to form sockets 30 for the ends of the usual spring connecting arms 31 of the pitman and mounted in the bearing to surround the crank pin is a bushing 32 formed at its outer end with a lug 34 accommodated in a suitable notch in the outer end of the bearing for limiting the bushing against rotation. Formed on the crank pin 17 at its outer end is a stud 35 and screwed upon said stud is a nut 36 securing the bearing against displacement, the nut being flanged to house the lug 34 of the bushing 32. Formed in said bushing at its inner side is a medial annular channel 37 and, as will now be observed, the valve 25, when seated, projects beyond the periphery of the crank pin into said channel. Screwed through the bearing and bushing at said channel to coact at its inner end with the valve is a radial wiping pin 38 and adjustable upon the pin to engage the bearing is a lock nut 39.

As will now be seen in view of the foregoing description, when the wheel 14 is revolved and the check valve 25 is accordingly caused to pass beneath the inner end of the pin 38, the pin will, as shown in detail in Figure 4, engage and depress the valve. Furthermore, as will be seen, by removing the plug 19, the oil chamber 18 may be readily filled so that oil will normally flow through the passages 20 and 21 of the crank pin into the passage 23, filling said latter passage. Accordingly, each time the wheel 14 is revolved and the valve 25 is opened, a small quantity of oil will, by centrifugal force, be thrown from the passage 23 into the channel 37 when the oil will, of course, spread between the crank pin 17 and the bushing 32 for lubricating the crank pin. A constant intermittent feed of lubricant will thus be had and, of course, by adjusting the pin 38, the opening movement of the valve 25 may be readily varied and the quantity of oil discharged at each revolution of the wheel thus regulated.

In Figure 5 of the drawings, we have illustrated a slight modification of the invention. At 40 we have conventionally shown a shaft and journaling the shaft is a bearing 41. Formed in the bearing at its inner side is an annular channel 42 and screwed into the bearing to communicate with said channel is an oil cup or reservoir 43 having a stem 44 provided at its inner end with a valve seat. Freely movable in the stem to cooperate with said seat is a check valve 45 normally held closed by a spring 46, and screwed upon the cup is a cap 47 provided at its inner side with a socket 48 seating said spring. Screwed into the shaft 40 is a radial wiping pin 49, the outer end of which is accommodated in the channel 42. Thus each time the shaft 40 revolves, the pin will engage and open the valve to admit lubricant between the shaft and bearing and, of course, the pin may be adjusted for regulating the opening movement of the valve.

Having thus described the invention, what is claimed as new is:

1. An oiler including a shaft having an oil passage therein opening through the periphery of the shaft, an oil reservoir associated with the shaft to communicate with said passage, a check valve controlling the discharge of oil from said passage, a bearing surrounding the shaft, and means carried by the bearing to intermittently engage and open said valve, said means being adjustable for varying the opening travel of said valve.

2. In an oiler of the character described, a flywheel provided with an oil chamber, a crank pin carried by the flywheel and provided with an oil passage communicating with said chamber and opening through the periphery of the pin, a check valve normally closing said passage, a bearing cooperating with said pin, and means carried by the bearing to intermittently engage and open said valve, said means being adjustable for varying the opening travel of the valve.

3. In an oiler of the character described, a flywheel, a crank pin carried thereby and provided with an oil passage opening through the periphery of the pin, the flywheel having a solid portion forming a counterweight for said pin and the solid portion of the wheel being recessed to provide an oil chamber communicating with said passage, a check valve normally closing said passage, a bearing cooperating with said crank pin, and means carried by the bearing to intermittently engage and open said valve.

4. An oiler including a shaft mounted to revolve in a circular path, a bearing surrounding said shaft, an oil reservoir revolving with said shaft and bearing for supplying lubricant between the parts, a check valve normally projecting from the periphery of the shaft and controlling discharge of lubricant to said parts, and a pin carried by the bearing to intermittently engage and open said valve, the pin being adjustable for varying the opening movement of the valve.

In testimony whereof we affix our signatures.

FOSTER A. LEUI. [L. S.]
CHARLES B. MATHOUSER. [L. S.]